United States Patent [19]

McNesby et al.

[11] Patent Number: 5,132,991
[45] Date of Patent: Jul. 21, 1992

[54] FRAME ERROR DETECTION SYSTEM

[75] Inventors: John McNesby, Mesa, Ariz.; David C. Crohn, Munich, Fed. Rep. of Germany

[73] Assignee: Siemens Aktiengesellschaft, Berlin and Munich, Fed. Rep. of Germany

[21] Appl. No.: 619,789

[22] Filed: Nov. 29, 1990

[51] Int. Cl.$^5$ .............................................. H04L 7/00
[52] U.S. Cl. .................................. 375/116; 370/105.4; 371/47.1
[58] Field of Search ....................... 375/106, 114, 116; 370/100.1, 105.1, 105.3, 105.4; 371/47.1

[56] References Cited

U.S. PATENT DOCUMENTS

| | | | |
|---|---|---|---|
| 3,585,507 | 6/1971 | Bickel | 307/360 |
| 4,768,192 | 8/1988 | Pattavina et al. | 370/105.1 |

*Primary Examiner*—Stephen Chin
*Assistant Examiner*—Young Tse
*Attorney, Agent, or Firm*—Joseph S. Codispoti; Eugene S. Indyk

[57] ABSTRACT

A frame error detection system for SONET which operates in both the OC-3 and OC-12 modes. The frame detection circuit operates by examining the incoming data bit stream, which is in parallel form, detecting A1 and A2 bytes and if, in the OC-3 mode, three consecutive A1 bytes are received, followed by three A2 bytes, then framing is correct. If one of these bytes is missing, then there is an error in framing. The bytes, as they are received and processed by the system, are stored in a series of flip-flops and the output logic signal therefrom is indicative of the framing condition as to whether it is correct or errored.

3 Claims, 1 Drawing Sheet

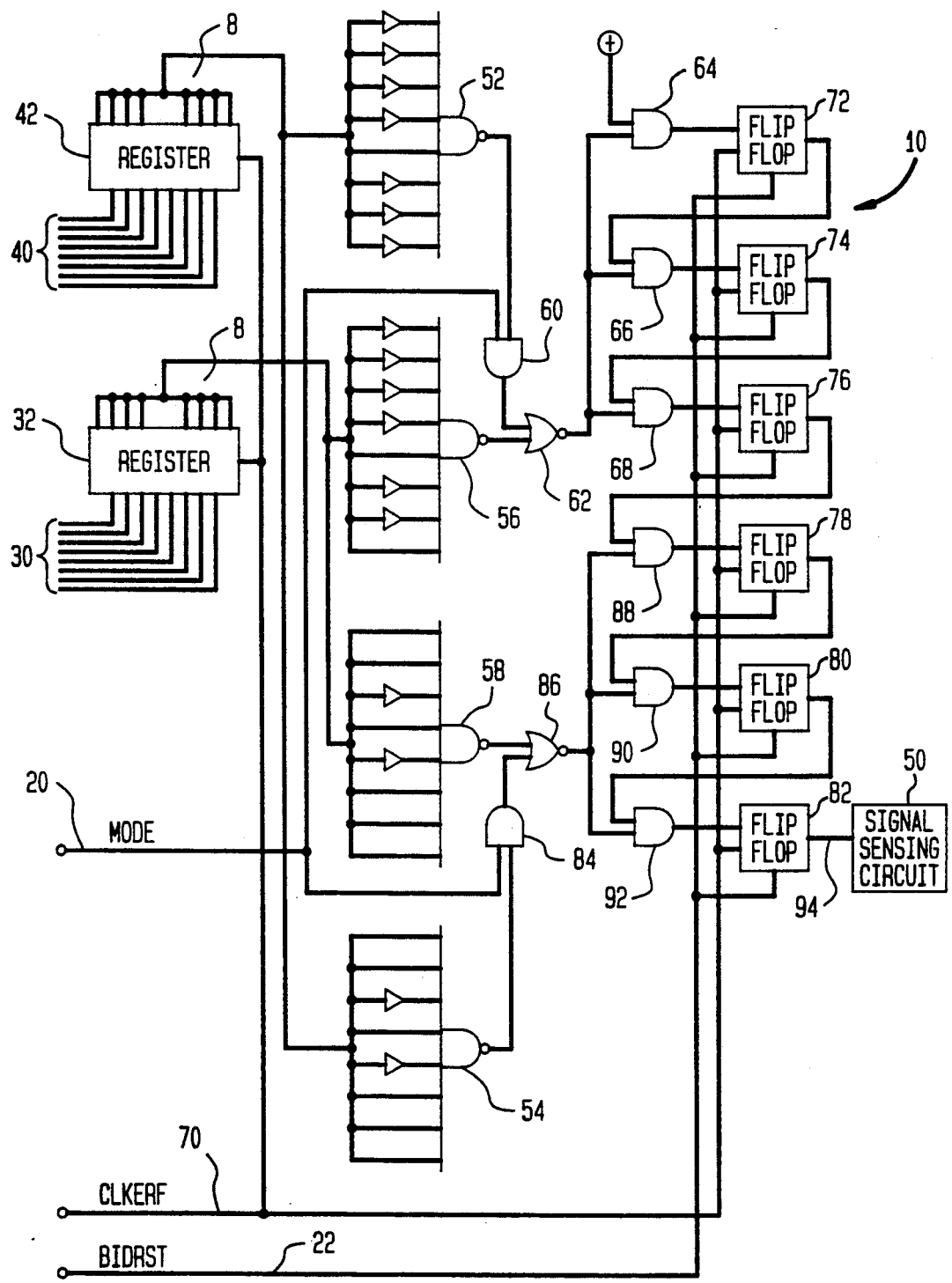
FIG.

FRAME ERROR DETECTION SYSTEM

BACKGROUND OF THE INVENTION

This invention relates to digital communications systems wherein data is serially transmitted in frames of multi-bit bytes and, more particularly, to an errored frame detection arrangement for use in such a system.

A relatively new transmission standard has been developed for Synchronous Optical Network (SONET), which is derived from a base rate and format, combined with a multiplexing scheme. This results in a modular family of rates and formats available for use in optical interfaces. The base rate is known as the Synchronous Transport Signal level 1 (STS-1). Each STS-1 frame is a serial bit stream of 810 bytes, with each byte including eight bits. The STS-1 framing is dedicated to the first two bytes of each STS-1 frame. The framing pattern for bytes A1 and A2 is F628 Hex (1111011000101000), where A1 equals F6 Hex (11110110) and A2 equals 28 Hex (00101000). Higher rates (STS-N) in SONET are accomplished by byte interleave multiplexing an N number of STS-1 frames. The framing pattern for an STS-3 frame in an Optical Carrier level 3 (OC-3) system is then A1A1A1A2A2A2. Similarly, the framing pattern for an STS-12 frame in an OC-12 system is twelve A1 bytes followed by twelve A2 bytes. This framing pattern of consecutive A1 Bytes followed by consecutive A2 bytes occurs every frame, or every 125 microseconds in one example of the system.

The SONET Specification specifies three levels of frame loss: Errored Frame, Out of Frame, and Loss of Frame. The Specification states a Loss of Frame (LOF) condition shall be detected on the incoming STS-N signal when an Out of Frame (OOF) condition persists for a period of 3 milliseconds, and an Out of Frame condition on an STS-N shall be detected when four consecutive errored framing patterns have been received. An errored framing pattern is when the A1A2 framing pattern is not detected at the proper 125 microsecond interval.

The basic function of a frame recovery circuit in a communications system is to recognize and lock onto the framing pattern, provide frame lock indication, and resynchronize the receiver to the incoming data stream in a minimum amount of time.

In the past, various circuits have been used for errored frame detection in data transmission systems. However, these circuits have used emitter coupled logic and, with such logic, an undesirably large number of circuits were required. Thus, these known circuits were undesirably complex and expensive.

Accordingly, it is a primary object of this invention to provide a frame error detection circuit which utilizes such logic circuits that a minimum number of circuits are required and a less expensive and complex system results than known in the past.

Another object of this invention is to provide a frame error detection circuit which may be used in both an OC-3 and OC-12 system.

SUMMARY OF THE INVENTION

The foregoing, and additional, objects are attained in accordance with the principles of this invention by providing a frame detection circuit which examines parallel bytes in the incoming data bit stream, detects A1 and A2 bytes, and counts three (or six) consecutive A1 bytes immediately followed by three (or six) consecutive A2 bytes. In the event consecutive A1 or A2 bytes are not detected, the circuit resets itself.

In accordance with an aspect of this invention, A1 and A2 bytes are recognized by routing the incoming parallel data bit stream into a parallel shift register and using simple NAND gates connected to appropriate logic level through inverters to the outputs of the parallel shift register.

In accordance with another aspect of the invention, the incoming detected data is applied to a circuit which determines whether the required logic signals representing correct framing have occurred within the required time period, i.e., 125 microseconds.

BRIEF DESCRIPTION OF THE DRAWING

The foregoing will be more readily apparent upon reading the following description in conjunction with the drawing in which the single figure is a schematic logic circuit diagram of an errored frame detection system constructed in accordance with the principles of this invention.

DETAILED DESCRIPTION

Some of the principles of the SONET system are described in co-pending application Ser. No. 07/589,234, filed Sept. 27, 1990, and entitled FRAME DETECTION SYSTEM. This application is incorporated herein by reference.

The drawing illustrates an errored frame detection system, designated generally by the reference numeral 10, which is designed in accordance with the principles of this invention to operate in both an OC-3 and an OC-12 system environment. The system 10 operates to examine each bit in a SONET STS-3 or STS-12 parallel bit stream to determine whether the data is properly framed.

The errored frame detector system 10 is designed to work in an OC-3 or an OC-12 system selectable by a mode control signal applied to the system 10 on lead 20. The external connections for an OC-3 and an OC-12 system differ in that in an OC-3 system, one parallel data bus 30 is used, operating at an STS-6 effective rate. In an OC-12 system, two parallel eight bit buses 30, 40, are used, each operating at an STS-6 effective rate. Each of the two parallel eight bit buses 30, 40, is latched into a respective eight bit parallel register 32, 42, whose outputs are examined for A1 and A2 bytes with the system being designed to operate with all logic "1's" for these data bytes on the inputs of NAND gates 52, 54, 56 and 58.

OC-3 operation will be described for purposes of illustration and in such operation, the mode select signal on lead 20 is low to block the outputs of NAND gates 52 and 54. Since an OC-3 system only has one eight bit parallel bus operational, it only needs NAND gates 56 and 58 active. The NOT outputs of the eight bit parallel registers 32, 42, are used to reduce loading on the data signal throughput outputs.

The inverters on the inputs to NAND gate 56 detect the inverse of an A1 byte F6 Hex (09 Hex) as the output of register 32 is inverted data. When an inverted A1 byte is detected, the output of NAND gate 56 is forced low. With the output of AND gate 60 nailed low by the mode signal on lead 20, the output of NOR gate 62 goes high whenever an A1 byte is clocked into the eight bit parallel register 32. The high output of NOR gate 62 enables AND gates 64, 66 and 68. Clock CLKERF on the lead 70 is the same clock that clocks the eight bit parallel register 32. As the three consecutive A1 bytes are clocked and detected a logic high propagates through flip-flops 72, 74 and 76. By similar methods, the logic high continues to propagate through flip-flops 78, 80 and 82 when the three consecutive A1 bytes are followed immediately by three consecutive A2 bytes. A lead 22 (BIDRST), a source of a power-up reset signal, is coupled to the clear inputs of the flip-flops 72, 74, 76, 78, 80 and 82.

The inverters on the inputs to NAND gate 58 detect the inverse of an A2 byte 28 Hex (D7 Hex) as the output of register 32 is inverted data. When an inverted A2 byte is detected, the output of NAND gate 58 is forced low. With the output of AND gate 60 nailed low by the mode signal on lead 20, the output of NOR gate 86 goes high whenever an A2 byte is clocked into the eight bit parallel register 32. The high output of NOR gate 86 enables AND gates 88, 90 and 92, propagating a logic high through flip-flops 78, 80 and 82. The high output of flip-flop 82 on the lead 94 indicates a correct frame word has been detected. The lead 94 is applied to a circuit 50 that checks whether or not the logic high occurred in the correct 125 microsecond period time window.

If at any time during the sequence of consecutive A1 bytes and A2 bytes a byte other than an A1 byte or A2 byte is detected, the flip-flops 72, 74, 76, 78, 80 and 82 are cleared and the signal on the lead 94 is a logic low. A logic low signal on the lead 94 (a correct frame word was not detected) 125 microsecond after the last high signal on the lead 94 is an indication of errored frame.

If four consecutive errored frames are indicated, OUT OF FRAME is declared and circuit 50 sets a three millisecond counter. If correct framing is detected (non errored frame), the three millisecond counter is reset. If errored framing continues for three milliseconds, the system is reset and a new frame is sought.

In OC-12 operation the MODE select signal on the lead 20 is high, enabling AND gates 60 and 84 and NAND gates 52 and 54 are active. An OC-12 system has two eight bit parallel buses operational and checks A1 bytes and A2 bytes in parallel. The parallel checking of A1 bytes and A2 bytes in an OC-12 system means six consecutive A1 bytes followed by six consecutive A2 bytes constitutes a correct frame pattern.

Accordingly, there has been described an arrangement for detecting errored frames in a digital communications system wherein data is parallelly transmitted in frames of multi-bit bytes. While a single embodiment has been disclosed, it will be apparent to those of ordinary skill in the art that various modifications and adaptations to the disclosed arrangement are possible, and it is only intended that this invention be limited by the scope of the appended claims.

We claim:

1. In a digital communications system wherein data is serially transmitted in frames of multi-bit bytes at a fixed clock rate and framing is defined by a framing pattern at the start of each frame, the framing pattern comprising a predetermined number of bytes of a first digital pattern followed by said predetermined number of bytes of a second digital pattern, an arrangement for detecting said framing pattern in transmitted data and providing an error signal when said framing pattern is not present, comprising:

a first NANA gate having N inputs and an output, wherein N is the number of bits in a byte, each of the N inputs being coupled to receive a corresponding data bit within a byte, said first NAND gate being arranged to provide a signal at its output when said first digital pattern is present at its input;

first, second, and third AND gates;

means for coupling the output of said first NAND gate to a first input of each of said first, second and third AND gates, a second input of said first AND gate being head at a predetermined level;

a second NAND gate having N inputs and an output, where N is the number of bits in a byte, each of the N inputs being coupled to receive a corresponding data bit within a byte, said second NAND gate being arranged to provide a signal at its output when said second digital pattern is present at its input;

fourth, fifth and sixth AND gates;

means for coupling the output of said second NAND gate to a first input of each of said fourth, fifth and sixth AND gates;

first, second, third fourth, fifth and sixth flip-flops;

the output of said first AND gate being coupled to said first flip-flop, the output of said second AND gate being coupled to said second flip-flop, the output of said third AND gate being coupled to said third flip-flop, the output of said fourth AND gate being coupled to said fourth flip-flop, the output of said fifth AND gate being coupled to said fifth flip-flop and the output of said sixth AND gate being coupled to said sixth flip-flop the output of said first flip-flop being coupled to a second input of said second AND gate, the output of said second flip-flop being coupled to a second input of said third AND gate, the output of said third flip-flop being coupled to a second input of said fourth AND gate, the output of said fourth flip-flop being coupled to a second input of said fifth AND gate and the output of said fifth flip-flop being coupled to a second input of said sixth AND gate;

a signal sensing circuit;

the output of said sixth flip-flop being coupled to said signal sensing circuit which periodically checks the output of said sixth flip-flop to determine the presence or absence of a signal thereat;

wherein when said framing pattern appears in transmitted data, first frame status signals appear at each of said flip-flops and said sensing circuit senses a first signal and when said framing pattern does not reappear in transmitted data within a predetermined time, said sensing circuit senses a second signal.

2. The system of claim 1 wherein said sensing circuit checks the output of said sixth flip-flop every 125 microseconds to determine the presence of said first or second signal thereat.

3. The system of claim 1 wherein said N number of bits is eight.

* * * * *